(12) United States Patent
Berger

(10) Patent No.: US 6,455,948 B1
(45) Date of Patent: Sep. 24, 2002

(54) METHOD AND DEVICE FOR AUTOMATICALLY FOLDING BACK THE SEATS OF A MOTOR VEHICLE

(75) Inventor: Rainer Josef Berger, Remscheid (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,194

(22) PCT Filed: Apr. 10, 1999

(86) PCT No.: PCT/DE99/01085

§ 371 (c)(1),
(2), (4) Date: Jun. 26, 2000

(87) PCT Pub. No.: WO00/12346

PCT Pub. Date: Mar. 9, 2000

(30) Foreign Application Priority Data

Aug. 27, 1998 (DE) .......................... 198 38 882

(51) Int. Cl.$^7$ ............................... B60N 2/02
(52) U.S. Cl. ................. 307/10.1; 297/330; 297/378.12; 296/65.01; 296/69; 296/66
(58) Field of Search .......................... 307/10.1; 296/66, 296/65.09, 68.1, 63, 65.05, 65.03, 39.2, 64, 65.16, 65.14, 69, 65.01; 297/378.12, 408, 336, 335, 15, 452.55, 14, 331, 330

(56) References Cited

U.S. PATENT DOCUMENTS

| | | | | |
|---|---|---|---|---|
| 3,097,881 A | * | 7/1963 | Aguilar | 296/66 |
| 3,227,488 A | | 1/1966 | Kenneth | |
| 3,669,488 A | * | 6/1972 | Derrickson, Jr. et al. | 296/66 |
| 4,133,556 A | * | 1/1979 | Glinski | 296/66 |
| 5,558,386 A | * | 9/1996 | Tilly et al. | 296/65.1 |
| 5,700,055 A | * | 12/1997 | Davidson et al. | 297/378.12 |
| 5,738,411 A | * | 4/1998 | Sutton et al. | 297/378.12 |
| 5,918,940 A | * | 7/1999 | Wakamatsu et al. | 297/378.12 |
| 5,965,993 A | * | 10/1999 | Bak et al. | 318/280 |
| 6,070,939 A | * | 6/2000 | Matsuo et al. | 297/378.12 |
| 6,113,187 A | * | 9/2000 | Sugiyama et al. | 297/378.12 |
| 6,231,101 B1 | * | 5/2001 | Kamida et al. | 297/14 |
| 6,234,553 B1 | * | 5/2001 | Eschelbach et al. | 296/65.14 |
| 6,237,981 B1 | * | 5/2001 | Selleck | 296/66 |

FOREIGN PATENT DOCUMENTS

| | | |
|---|---|---|
| EP | 0 082 664 A | 6/1983 |
| EP | 0 260 631 A | 3/1988 |
| EP | 0 834 418 A | 4/1998 |
| JP | 01172039 A * | 7/1989 |
| WO | 94 01302 A | 1/1994 |

* cited by examiner

*Primary Examiner*—Brian Sircus
*Assistant Examiner*—Roberto J. Rios
(74) *Attorney, Agent, or Firm*—Michael J. Striker

(57) ABSTRACT

An apparatus for folding down back seats in a motor vehicle in order to enlarge the cargo volume, having individual seat elements that can be moved in relation to one another, wherein at least one seat element or a part of a seat element can constitute a part of a loading surface (10), and having drive mechanisms (12, 14, 16) which are connected to the individual seat elements. The proposal is made that a first drive mechanism (12) be disposed at a rotation point (18) of a seat bottom (20), a second drive mechanism (14) be disposed at a sliding point (22) of a headrest (24), and a third drive mechanism (16) be disposed at a rotation point (26) of a seatback (28).

11 Claims, 1 Drawing Sheet

METHOD AND DEVICE FOR AUTOMATICALLY FOLDING BACK THE SEATS OF A MOTOR VEHICLE

BACKGROUND OF THE INVENTION

The invention relates to an apparatus and method for automatically folding down back seats in a motor vehicle, as generically defined by the independent claims.

In many motor vehicles, particularly in dual purpose vehicles that are distinguished by a large, flat loading surface, the cargo space or cargo volume can be increased by folding down the back seats. This folding down is often quite difficult, because it is usually only possible from the rear doors of the vehicle. With a split rear bench seat, each of the seat parts must also be folded down from the respective side of the vehicle. In addition, more often than not, locking mechanisms have to be actuated or seatbacks or seat bottoms have to be moved from a "locked position" with an increased expenditure of force.

For these reasons, the folding down of back seats is generally time consuming and stressful. It is therefore desirable to automate the folding down of back seats for the purpose of enlarging the cargo volume through the use of adjusting drive mechanisms of the type that are already commonly used to adjust front seats.

SUMMARY

The device according to the invention, with the features of the main claim, has the advantage that folding down the back seats in order to enlarge the cargo volume in a vehicle is made significantly easier because this no longer has to be carried out by hand, but can occur automatically at the press of a button. In order to adjust the different seat elements, a first drive mechanism is provided at a rotation point of a seat bottom, a second drive mechanism is provided at a slide point of a headrest, and a third drive mechanism is provided at a rotation point of a backrest. The disposition of these drive mechanisms permits the automatic folding and achieves a flat, self-contained, enlarged cargo space.

It is advantageous if the seat elements, which constitute a part of the loading surface, are formed or embodied so that they integrate into the cargo space as well as possible and are able to withstand the increased stresses which a cargo space is subjected to.

Advantageous improvements of the apparatus according to the main claim are possible through the measures taken in the dependent claims.

If sensors are provided which detect the position of the moving seat elements, then it is clear where the individual seat elements are positioned at any time. This is advantageous because this information can be used for control purposes. Potentiometers are sensors that are suitable for this and are respectively embodied as rotary potentiometers at the respective rotation points and are embodied as sliding potentiometers at the sliding points. A continuous detection of the position of the seat elements over the entire movement range is assured with these known sensors.

In exactly the same manner, magnetic or optical sensors can be used, by means of which the position of the seat elements can be determined by detecting the speed of the drive mechanism. Particularly suitable candidates for these magnetic sensors turn out to be Hall sensors that are attached to a drive shaft of a motor and detect its position, speed, and rotation direction.

It is also conceivable that the sensors are accommodated in a control unit and detect a signal, which is typical for the position of the seat elements and which comes from the drive mechanisms. For example, a signal of this kind is the current waviness produced by means of a commutator of the motor.

In addition, a control unit is advantageous which remains in contact with both the drive mechanisms and the sensors for position detection. This control unit can not only cause the drive mechanisms to move the seat elements, it can also influence the drive mechanisms in reaction to impulses of the sensors. Consequently, the decisive advantage is achieved that the system is in a position to detect incorrect movements and if need be, to correct them.

For example, if the seat bottom is folding upward so slowly that a collision with the downward-folding seatback is imminent, then the control unit can detect this based on the position data and can influence the drive mechanisms in such a way that the folding down of the seat back occurs more slowly or is stopped temporarily.

If a correction of the movements is not possible because certain seat elements cannot be moved by the desired amount, for example due objects being disposed on them, then the entire process can be stopped or reversed in time before more serious damage occurs.

In order to actuate the apparatus, an operating element is provided, which communicates with the control unit and initiates the movement of the seat elements. With this operating element, the corresponding commands for folding the back seats down or raising them into the upright position can be transmitted to the control unit. In this connection, it is advantageous if this operating element is disposed in the vicinity of the trunk lid or the hatch because the fold-down mechanism is needed particularly when loading or unloading the vehicle.

A corresponding method for folding down back seats in a vehicle for the purpose of enlarging the cargo volume can be carried out with the apparatus according to the invention disclosed in the main claim. With this method, a controlled movement of the individual seat elements of the back seat takes place, wherein when the back seat is folded down, first a seat bottom is raised upright, then a headrest is retracted, and finally, a seatback is folded down. Naturally this sequence is not absolutely required; it is only important that it produces the desired results. The sequential process is even less absolutely necessary; on the contrary, it is quite advantageous if the movements of the seat elements occur at the same time. This leads to a considerable reduction in the adjusting time.

If the current position of each of the moving seat elements is detected via sensors and these data are transmitted to a control unit, then it is possible that the control unit exerts a corrective influence on the drive mechanisms. This has the previously mentioned advantage that an imminent incorrect adjustment of the simultaneously moving seat elements is detected and can be corrected or stopped by means of the drive mechanisms.

The corrective influence, however, can also be effected in the event that objects become clamped in the seat, wherein this can be detected, for example, by evaluating speed changes.

With the method, the provision is also made that the movements of the seat elements can be reversed. This is sensible and advantageous because the reverse process of moving the back seat into the upright position again manually is just as difficult as folding the back seats down. The movements then occur in the reverse sequence, or in the case of simultaneous movement, occur in accordance with the sequence provided for this and predetermined by the control unit. The reversal of the movement procedure can be achieved without additional expense.

BRIEF DESCRIPTION OF THE DRAWINGS

An exemplary embodiment of an apparatus according to the invention is shown in the drawings and will be explained in detail in the subsequent description.

DETAILED DESCRIPTION OF THE PREFERRED EMBODIMENTS

Figure 1:
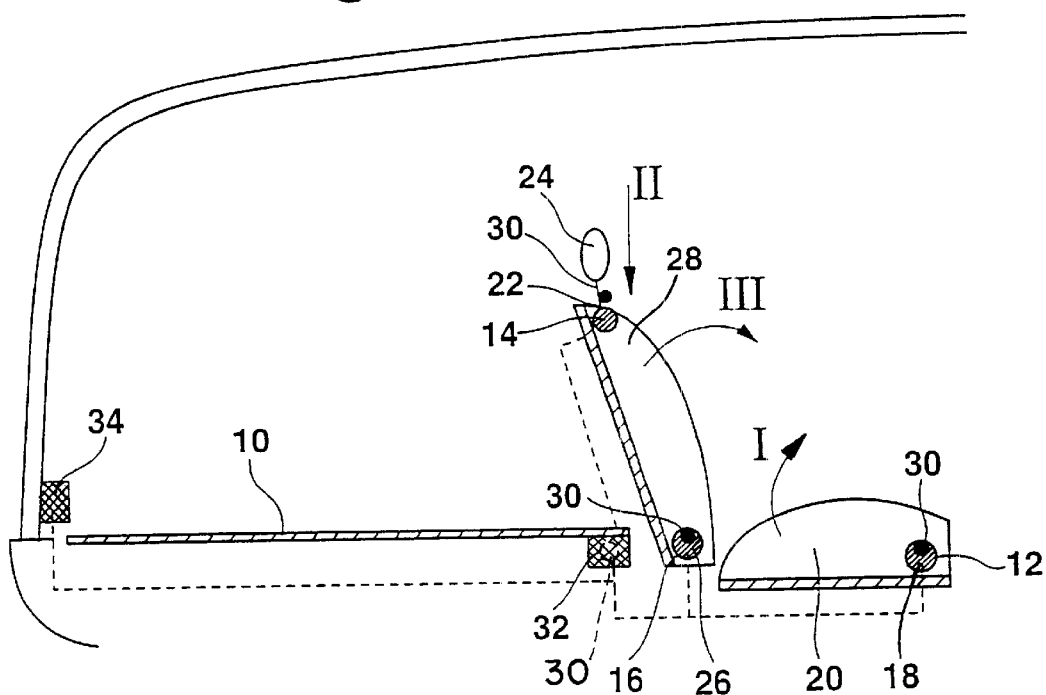
FIG. 1 is a side view of the exemplary embodiment with the back seats in the upright position.

The exemplary embodiment of an apparatus according to the invention shown in FIG. 1 depicts the three seat elements of a back seat, which can be moved in relation to one another, namely the seat bottom 20, the seatback 28, and the headrest 24. A first drive mechanism 12 can fold the seat bottom 20 into the upright position in the direction of the front vehicle seats around a rotation point 18 in the front region of the seat bottom 20. This adjustment possibility is indicated with an arrow I. By means of a second drive mechanism 14 at a sliding point 22 of the headrest 24, the headrest 24 can be retracted into the seatback so that it does not collide with the upward-folding seat bottom 20 when the seatback 28 is folded down. The seatback 28 is folded down by a third drive mechanism 16 around a rotation point 26 of the seatback 28.

The retraction of the headrest 24 into the seatback 28 is indicated with an arrow II and the folding down of the seatback 28 is indicated with an arrow III.

In order to detect the position of the moving seat elements, sensors 30 are provided, which are attached at a location of the rotation points 18, 26 and of the sliding point 22. However, they can also be directly attached to or incorporated into the drive mechanisms 12, 14, 16.

A control unit 32 communicates with the drive mechanisms 12, 14, 16 and can influence them in reaction to impulses of the sensors 30. As a result, it is possible to initiate corrective measures in the event of an imminent locking or collision of the moving seat elements.

The adjustment processes can be activated by means of an operating element 34 that communicates with the control unit 32. In the exemplary embodiment, the operating element 34 is attached in the vicinity of the hatch.

With the exemplary embodiment, the claimed method can be carried out based on the movements indicated with the arrows I, II, III. In order to fold down the back seats, first the seat bottom 20 is raised into the upright position, then the headrest 24 is retracted, and finally the seatback 28 is folded down. This produces a flat loading surface and a self-contained cargo space. In the reverse process of folding the back seat into the upright position according to FIG. 2, first the seatback 28 is folded into the upright position, then the seat bottom 20 is folded back down into the original position, and finally the headrest 24 is extended.

Naturally, the movements or adjustment procedures explained above can be meaningfully reversed in their sequence or combined. This combination of the adjusting procedures is therefore particularly reliable because the control unit 32 can exert a corrective influence on the drive mechanisms at any time.

Figure 2:
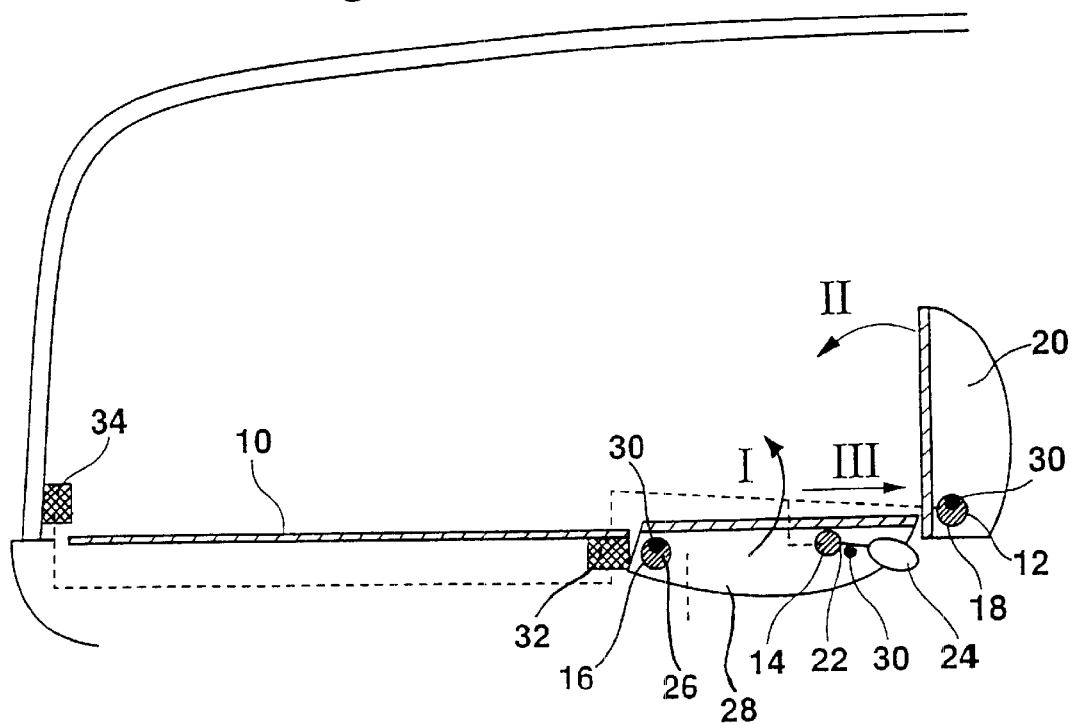
FIG. 2 shows the same exemplary embodiment with the back seats folded down.

The sensors 30 can be disposed in the control unit 32, as shown in broken lines in FIG. 2.

In addition to be exemplary embodiment depicted, numerous variants and modifications are possible. The operating element 34 can also be disposed in the vicinity of the seat to be folded down or can be disposed near the driver. It is also conceivable that a number of operating elements 34 are disposed distributed around the vehicle. For example, the sensors 30 can also be completely eliminated if a position can be calculated by means of parameters of the drive mechanisms 12, 14, 16—e.g. the speed.

What is claimed is:

1. An apparatus for folding down back seats in a motor vehicle in order to enlarge the cargo volume, having individual seat elements that can be moved in relation to one another, wherein at least one seat element or a part of a seat element can constitute a part of a loading surface (10), and having drive mechanisms (12, 14, 16) which are connected to the individual seat elements, characterized in that a first drive mechanism (12) is disposed at a rotation point (18) of a seat bottom (20), a second drive mechanism (14) is disposed at a sliding point (22) of a headrest (24), and a third drive mechanism (16) is disposed at a rotation point (26) of a seatback (28), wherein sensors (30) are provided to detect the position of the moving seat elements.

2. The apparatus according to claim 1, characterized in that the sensors (30) are potentiometers which are fastened to the rotation points (18, 26) and sliding points (22) of the seat elements.

3. The apparatus according to claim 1, characterized in that the sensors (30) are magnetic or optical sensors which are disposed on the drive mechanisms (12, 14, 16).

4. The apparatus according to claim 1, characterized in that the sensors (30) are disposed in a control unit (32).

5. The apparatus according to claim 1, characterized in that a control (32) is provided, wherein said control unit (32) influences the drive mechanisms (12, 14, 16) in reaction to impulses of the sensors (30).

6. The apparatus according to claim 5, characterized by means of an operating element (34), which communicates with the control unit (32) and initiates the movement of the seat elements.

7. A method for folding down back seats in a motor vehicle in order to enlarge the cargo volume, having the following steps:
a command is transmitted from a control unit to a first drive mechanism (12), the first drive mechanism (12) folds a seat bottom (20) upright around a rotation point (18) of the seat bottom (20), a command is transmitted from a control unit (32) to a second drive mechanism (14), the second drive mechanism (14) vertically adjusts a headrest (24) in the direction of a seatback (28) via a sliding point (22) of the headrest (24), a command is transmitted from a control u nit (32) to a third drive mechanism (16), the third drive mechanism (16) folds a seatback (28) down around a rotation point (26) of the seatback (28), wherein a current position of each of the moving seat elements Is detected by sensors (30) and these data are transmitted to a control unit (32).

8. The method according to claim 7, characterized in that the movements of the seat elements essentially occur at the same time.

9. The method according to claim 8, characterized in that the control unit (32) exerts a corrective influence on the drive mechanisms (12, 14, 16).

10. The method according to claim 7, characterized in that the movement or the seat elements is initiated by an operating element (34) that communicates with the control unit (32).

11. The method according to claim 10, characterized in that the movements of the seat elements are reversed by means of a new actuation of the operating element (34).

* * * * *